US012653308B2

(12) United States Patent
Finney et al.

(10) Patent No.: US 12,653,308 B2
(45) Date of Patent: Jun. 16, 2026

(54) APPARATUS FOR MANAGEMENT OF ACCESS KEY USED FOR LOCKER ACCESS

(71) Applicant: BEST LOCKERS, LLC, Orlando, FL (US)

(72) Inventors: Cory Finney, Boulder, CO (US);
Christian Nitu, Boulder, CO (US);
Nick Ramsey, Boulder, CO (US);
Jordan Darrington, Boulder, CO (US);
Jonathan White, Boulder, CO (US);
Matt Hoenecke, Boulder, CO (US)

(73) Assignee: BEST LOCKERS, LLC, Orlando, FL (US)

( * ) Notice: Subject to any disclaimer, the term of this patent is extended or adjusted under 35 U.S.C. 154(b) by 113 days.

(21) Appl. No.: 18/535,863

(22) Filed: Dec. 11, 2023

(65) Prior Publication Data

US 2024/0122341 A1    Apr. 18, 2024

Related U.S. Application Data

(63) Continuation of application No. 17/463,455, filed on Aug. 31, 2021, now Pat. No. 11,839,299, which is a
(Continued)

(51) Int. Cl.
*A47B 81/00*        (2006.01)
*A47B 51/00*        (2006.01)
(Continued)

(52) U.S. Cl.
CPC ............ *A47B 81/005* (2013.01); *A47B 51/00* (2013.01); *E05B 47/00* (2013.01);
(Continued)

(58) Field of Classification Search
CPC . A47B 81/005; A47B 51/00; A47B 2051/005; A47B 2220/0097;
(Continued)

(56) References Cited

U.S. PATENT DOCUMENTS 3,338,422 A    8/1967    Hickok
3,604,228 A    9/1971    Conlon
(Continued)

*Primary Examiner* — Monica E Millner
(74) *Attorney, Agent, or Firm* — DLA Piper LLP US

(57) ABSTRACT

An apparatus for use with a rack of lockers is disclosed. The apparatus includes a key-facilitation server configured to cooperate with a locker server, and also configured to receive a key-access request. The locker server is associated with a rack of lockers including a first compartment configured to allow storage of secondary equipment, a second compartment having an open locker slot configured to maintain storage of equipment, and a locker divider separating the first compartment from the second compartment. The key-access request is configured to indicate a user request configured to request usage of an access key to be usable by the locker server. The locker server is configured to receive a locker-access request to indicate access of a selected locker is user requested. The locker server is configured to use the access key to facilitate secured user access of the selected locker associated with the rack of lockers.

7 Claims, 10 Drawing Sheets

Related U.S. Application Data continuation of application No. 16/663,057, filed on Oct. 24, 2019, now Pat. No. 11,103,063, which is a continuation of application No. 15/585,047, filed on May 2, 2017, now abandoned, which is a continuation of application No. 13/936,211, filed on Jul. 8, 2013, now abandoned.

(51) Int. Cl.

| | | |
|---|---|---|
| *E05B 47/00* | (2006.01) | |
| *G07C 9/00* | (2020.01) | |
| *G07F 17/10* | (2006.01) | |
| *G07F 17/12* | (2006.01) | |
| *H04L 67/10* | (2022.01) | |

(52) U.S. Cl.
CPC ......... *G07C 9/00309* (2013.01); *G07F 17/10* (2013.01); *G07F 17/12* (2013.01); *H04L 67/10* (2013.01); *A47B 2051/005* (2013.01); *A47B 2220/0097* (2013.01); *B62H 2700/00* (2013.01); *E05B 2047/0095* (2013.01); *Y10T 70/5009* (2015.04); *Y10T 70/625* (2015.04); *Y10T 70/65* (2015.04)

(58) Field of Classification Search
CPC ............. E05B 2047/0095; E05B 47/00; G07C 9/00309; G07F 17/10; G07F 17/12; H04L 67/10; Y10T 70/5009; Y10T 70/625; Y10T 70/65; B62H 2700/00
See application file for complete search history.

(56) References Cited

U.S. PATENT DOCUMENTS

| | | | |
|---|---|---|---|
| 4,289,363 A | 9/1981 | Andersson et al. | |
| 4,494,805 A | 1/1985 | Washburn | |
| 4,666,220 A | 5/1987 | Bucaille et al. | |
| 4,698,630 A | 10/1987 | Ellsberg | |
| 5,095,566 A | 3/1992 | Russell | |
| 5,169,222 A | 12/1992 | Bollore et al. | |
| 5,231,272 A | 7/1993 | Mardon | |
| 5,345,379 A | 9/1994 | Brous et al. | |
| 5,477,968 A | 12/1995 | Largent et al. | |
| 5,743,418 A | 4/1998 | Ahrens | |
| 5,894,277 A | 4/1999 | Keskin et al. | |
| 5,946,660 A | 8/1999 | Mccarty et al. | |
| 6,116,506 A | 9/2000 | Matsumoto et al. | |
| 6,185,773 B1 | 2/2001 | Goedde | |
| 6,655,180 B2 | 12/2003 | Gokcebay et al. | |
| 6,688,435 B1 | 2/2004 | Will et al. | |
| 6,694,217 B2 | 2/2004 | Bloom | |
| 6,791,450 B2 | 9/2004 | Gokcebay et al. | |
| 6,806,807 B2 | 10/2004 | Cayne et al. | |
| 6,862,576 B1 | 3/2005 | Turner et al. | |
| 6,879,243 B1 | 4/2005 | Booth et al. | |
| 6,882,269 B2 | 4/2005 | Moreno | |
| 6,895,241 B2 | 5/2005 | Hara | |

| | | | |
|---|---|---|---|
| 6,899,268 B2 | 5/2005 | Hara | |
| 6,999,825 B2 | 2/2006 | Inomata | |
| 7,068,149 B2 | 6/2006 | Lee et al. | |
| 7,108,171 B1 | 9/2006 | Ergo et al. | |
| 7,176,782 B2 | 2/2007 | Shitan | |
| 7,323,967 B2 | 1/2008 | Booth et al. | |
| 7,445,300 B2 | 11/2008 | Collins et al. | |
| 7,477,132 B2 | 1/2009 | Mayer et al. | |
| 7,705,731 B2 | 4/2010 | Trammell, III | |
| 7,760,069 B2 | 7/2010 | Cayne et al. | |
| 7,764,176 B2 | 7/2010 | Zhang et al. | |
| 7,886,964 B2 | 2/2011 | Steinecker | |
| 8,207,816 B2 * | 6/2012 | Crigger .................. G07C 9/253 |
| | | | 340/5.52 |
| 8,500,012 B2 | 8/2013 | Amdahl et al. | |
| 8,639,578 B2 | 1/2014 | Barber et al. | |
| 8,698,596 B2 | 4/2014 | Rudduck et al. | |
| 9,015,281 B2 | 4/2015 | Moffat | |
| 9,330,512 B2 | 5/2016 | Ogata | |
| 10,096,183 B2 | 10/2018 | Nitu et al. | |
| 10,957,135 B2 | 3/2021 | Mcgehee | |
| 11,103,063 B2 * | 8/2021 | Finney .................. G07F 17/10 |
| 11,839,299 B2 * | 12/2023 | Finney .................. A47B 51/00 |
| 2002/0027160 A1 * | 3/2002 | Hara ........................ G07C 9/27 |
| | | | 235/375 |
| 2002/0035515 A1 | 3/2002 | Moreno | |
| 2002/0080030 A1 * | 6/2002 | Inomata ............. G07F 17/0014 |
| | | | 340/542 |
| 2002/0180582 A1 | 12/2002 | Nielsen | |
| 2003/0141840 A1 | 7/2003 | Sanders | |
| 2003/0222760 A1 | 12/2003 | Hara | |
| 2003/0227550 A1 | 12/2003 | Manico et al. | |
| 2004/0015393 A1 | 1/2004 | Fong et al. | |
| 2005/0015349 A1 | 1/2005 | Mayer et al. | |
| 2005/0068178 A1 | 3/2005 | Lee et al. | |
| 2005/0083176 A1 | 4/2005 | Yamada | |
| 2005/0190037 A1 | 9/2005 | Shitan et al. | |
| 2006/0048233 A1 * | 3/2006 | Buttross .................. G07C 9/215 |
| | | | 726/28 |
| 2006/0179724 A1 | 8/2006 | Lee | |
| 2007/0296545 A1 | 12/2007 | Clare | |
| 2008/0170355 A1 | 7/2008 | Kyriakides et al. | |
| 2009/0033456 A1 | 2/2009 | Castillo et al. | |
| 2009/0179735 A1 | 7/2009 | Van Rysselberghe | |
| 2009/0267564 A1 | 10/2009 | Gerber | |
| 2010/0102780 A1 | 4/2010 | Koh | |
| 2011/0074541 A1 | 3/2011 | Jones | |
| 2011/0240572 A1 | 10/2011 | Kerman | |
| 2011/0301748 A1 | 12/2011 | Lecarpentier | |
| 2012/0078413 A1 | 3/2012 | Baker, Jr. | |
| 2012/0098493 A1 | 4/2012 | Budike | |
| 2012/0138548 A1 | 6/2012 | Young | |
| 2012/0228466 A1 | 9/2012 | Haidvogl | |
| 2013/0127593 A1 | 5/2013 | Kuenzi et al. | |
| 2013/0166067 A1 | 6/2013 | Irwin et al. | |
| 2013/0307382 A1 | 11/2013 | Garrison | |
| 2014/0035721 A1 | 2/2014 | Heppe et al. | |
| 2014/0240087 A1 | 8/2014 | Liu et al. | |
| 2016/0036594 A1 | 2/2016 | Conrad et al. | |
| 2018/0253786 A1 | 9/2018 | Frisby et al. | |

* cited by examiner

APPARATUS FOR MANAGEMENT OF ACCESS KEY USED FOR LOCKER ACCESS

BACKGROUND OF THE INVENTION

1. Field of the Invention

The present invention pertains to lockers having controllable access thereto, and/or assemblies associated therewith.

2. Description of Related Art

U.S. Pat. No. 7,764,176 (Inventor: Wenhao QIN) discloses a method for confirming a entry state and/or an exit state of a mobile object relative to an entrance of an underground passageway by utilizing Radio Frequency Identification (RFID) technology.

U.S. Patent Publication Number 2011/0074541 (Inventors: Matthew Preston JONES et al.) discloses a system for managing a plurality of lockers proximate a theme park attraction. The system has an electronically actuated lock disposed on the plurality of lockers. A guest identifier is carried by the user. The identifier is used as an electronic key configured to lock and unlock the lock.

U.S. Pat. No. 4,494,805 (inventor: Philip J. WASHBURN) discloses a ski locker building having rows of lockers each configured to receive the mid-portion of a pair of skis in such a way that he skis are confined against lengthwise removal.

SUMMARY

In one embodiment, the present invention provides an apparatus for use with a rack of lockers. The apparatus comprises a key-facilitation server configured to: (A) cooperate with a locker server, and (B) receive a key-access request. The locker server is associated with a rack of lockers including a first compartment configured to allow storage of secondary equipment, a second compartment having an open locker slot configured to maintain storage of equipment, and a locker divider separating the first compartment from the second compartment. The key-access request is configured to indicate a user request. The user request is configured to request usage of an access key. The access key is configured to be usable by the locker server. The locker server is configured to receive a locker-access request. The locker-access request is configured to indicate access of a selected locker is user requested. The locker server is configured to use the access key so as to facilitate secured user access of the selected locker associated with the rack of lockers.

In a second embodiment, the present invention provides an apparatus for use with a rack of lockers. The apparatus comprises a point-of-presence server configured to cooperate with a locker server, operatively communicate with a key-facilitation server, and receive a key-access request. The locker server is associated with a rack of lockers including a first compartment configured to allow storage of secondary equipment, a second compartment having an open locker slot configured to maintain storage of equipment, and a locker divider separating the first compartment from the second compartment. The key-access request is configured to indicate a user request. The user request is configured to request usage of an access key. The access key is configured to be usable by the locker server. The locker server is configured to receive a locker-access request. The locker-access request is configured to indicate access of a selected locker is user requested. The locker server is configured to use the access key so as to facilitate secured user access of the selected locker associated with the rack of lockers.

In a third embodiment, the present invention provides an apparatus for use with a rack of lockers. The apparatus comprises a locker server configured to cooperate with a key-facilitation server. The locker server is associated with a rack of lockers including a first compartment configured to allow storage of secondary equipment, a second compartment having an open locker slot configured to maintain storage of equipment, and a locker divider separating the first compartment from the second compartment. The key-facilitation server is configured to receive a key-access request. The key-access request is configured to indicate a user request. The user request is configured to request usage of an access key. The access key is configured to be usable by the locker server. The key-facilitation server is configured to transmit a key-deployment indication configured to indicate approved deployment of the access key in such a way that the access key is operatively usable (directly or indirectly) by the locker server.

In a fourth embodiment, the present invention provides an apparatus, comprising: a rack of lockers, including: a first compartment configured to allow storage of dry equipment, and the first compartment is enclosed with a locker wall, a top, bottom panel, and the locker divider; a second compartment having an open locker slot, and the second compartment and the open locker slot are configured to maintain storage of equipment in such a way that the equipment is stored suspended, and the open locker slot is configured to allow sliding, at least in part, of equipment into the second compartment so that at least some of the equipment may remain user viewable; and a locker divider dividing the first compartment from the second compartment in such a way that the locker divider separates wet equipment from dry equipment.

In a fifth embodiment, the present invention provides an apparatus for use with a rack of lockers, the apparatus comprising: an object tangibly embodying an application configured to facilitate communication between the object and a key-facilitation server, the key-facilitation server configured to: cooperate with a locker server associated with the rack of lockers including: a first compartment configured to allow storage of secondary equipment; a second compartment having an open locker slot configured to maintain storage of equipment; and a locker divider separating the first compartment from the second compartment; and receive a key-access request, the key-access request configured to indicate a user request configured to request usage of an access key, the access key configured to be usable by the locker server, the locker server configured to receive a locker-access request, the locker-access request configured to indicate access of a selected locker is user requested, the locker server configured to use the access key so as to facilitate secured user access of the selected locker associated with the rack of lockers.

Other embodiments are also identified in the detailed description.

Objects and Advantages

The present disclosure can provide a number of advantages depending on the particular aspect, embodiment, and/or configuration. None of the particular objects or advantages that follow must be entirely satisfied as they are non-exclusive alternatives and at least one of the following objects is met; accordingly, several objects and advantages of the present invention are:

(a) to provide a means for allowing the user to securely and conveniently store different equipment outdoors (if so desired).

(b) to provide a means for generating revenue from fee transactions for using the examples of the invention (if so desired).

(c) to provide a means to allow users to view, at least in part, equipment stored in a locker (if so desired).

(d) other advantages may be provided by the various options (whether explicitly identified or not explicitly identified as such).

These and other objectives and advantages of the instant invention will become apparent from the following description taken in conjunction with the accompanying drawings wherein are set forth, by way of illustration and example, certain embodiments of the instant invention. The drawings are intended to constitute a part of this specification and include exemplary embodiments of the present invention and illustrate various objects and features thereof.

BRIEF DESCRIPTION OF THE DRAWINGS

The above, and other, aspects, features, and advantages of several embodiments of the present disclosure will be more apparent from the following Detailed Description as presented in conjunction with the following several figures of the Drawings.

1. FIGURES

Figure 1:
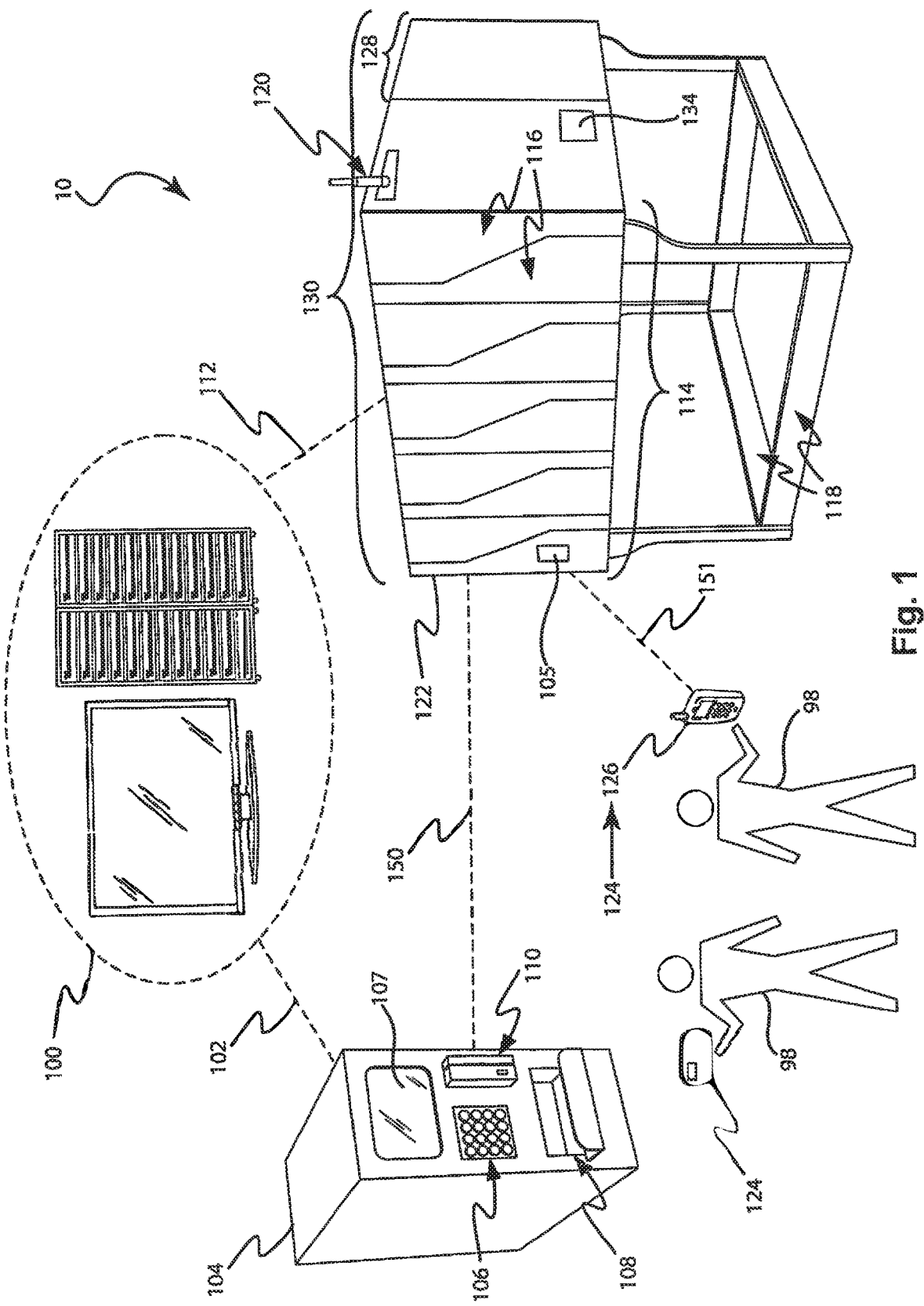

FIG. 1 (Sheet 1) depicts a schematic representation of an apparatus that may be used with a rack of lockers.

Figure 2:
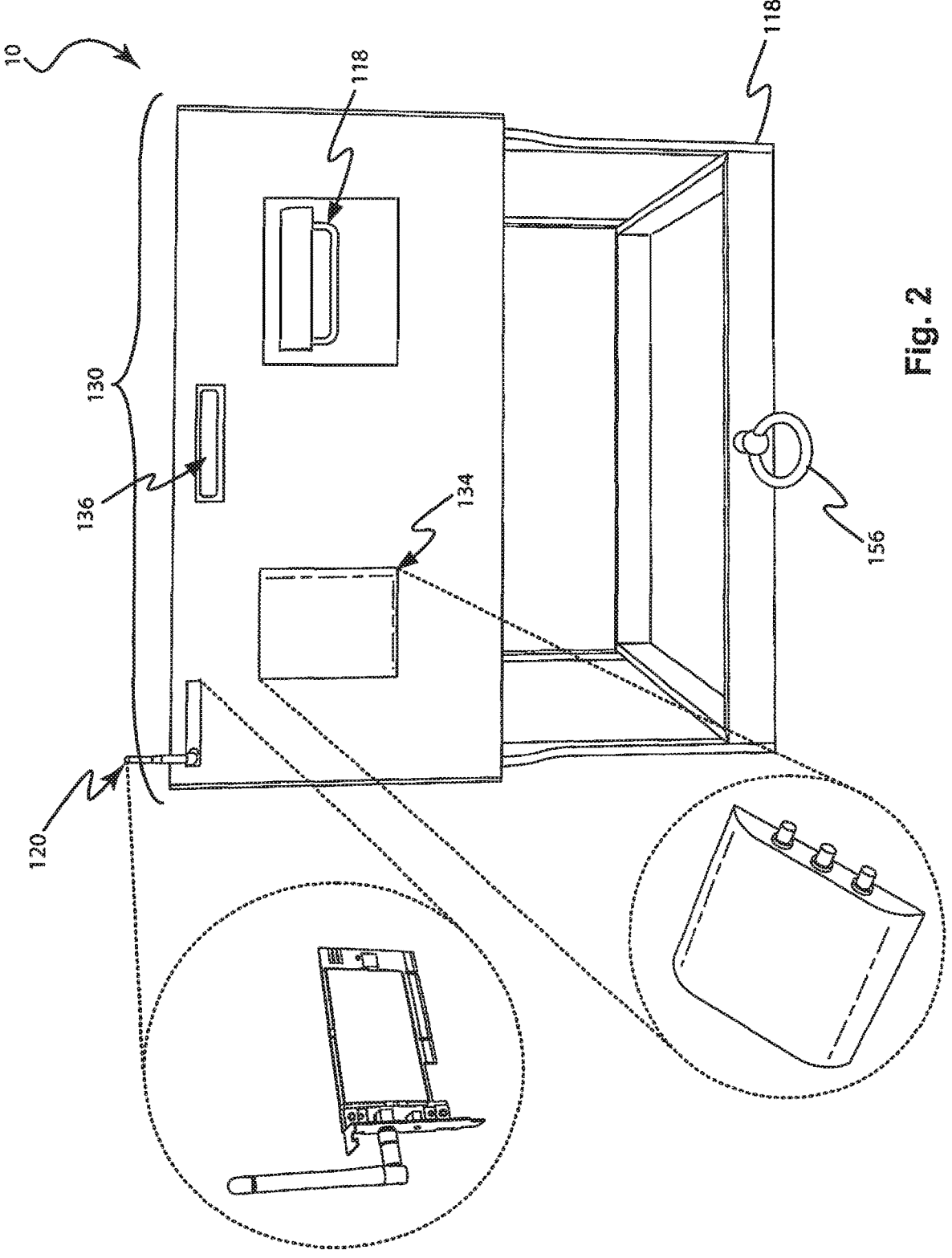

FIG. 2 (Sheet 2) depicts a rear view of a schematic representation of the rack of lockers of FIG. 1.

Figure 3:
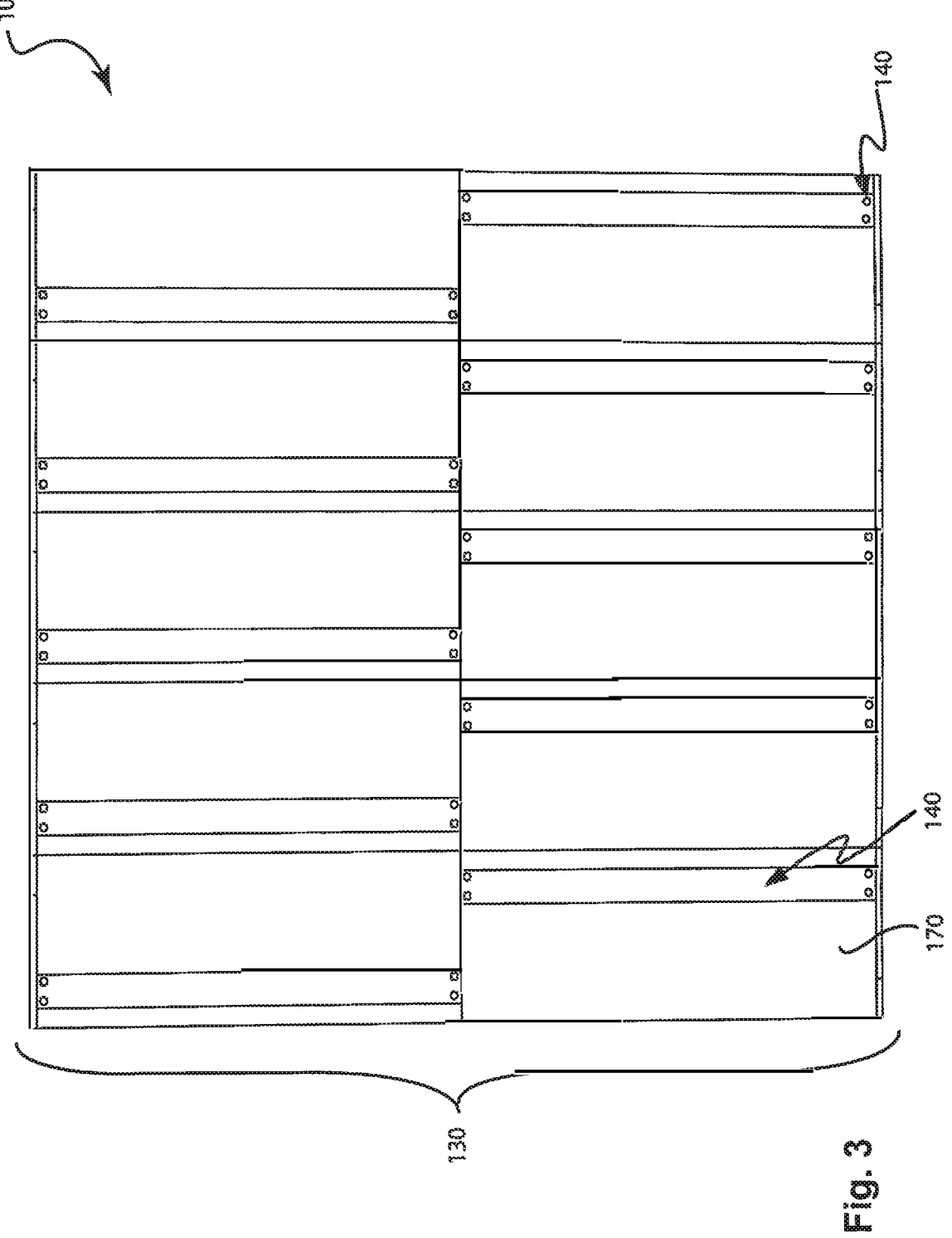

FIG. 3 (Sheet 3) depicts a front view of a schematic representation of the rack of lockers of FIG. 1.

Figure 4:
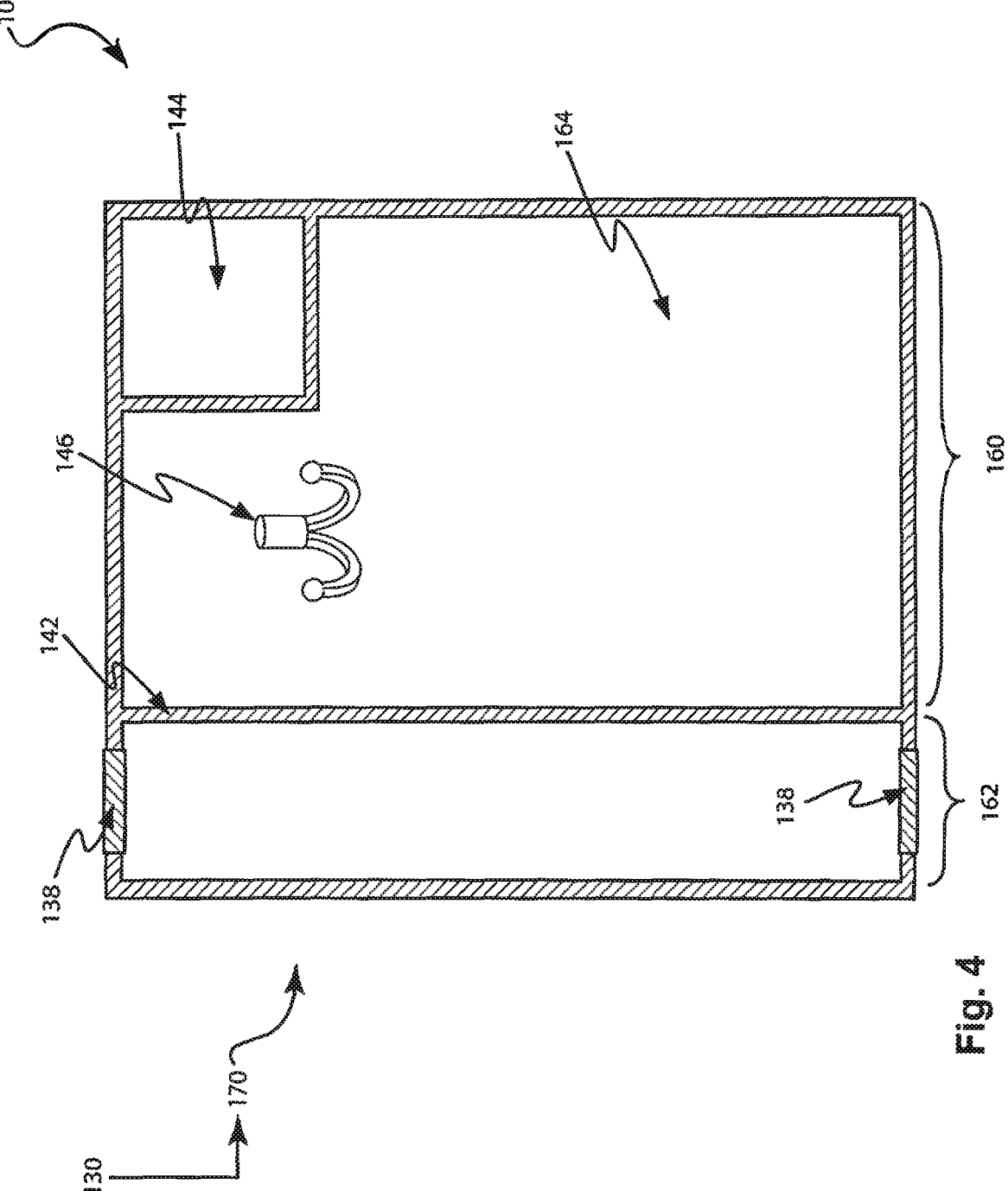

FIG. 4 (Sheet 4) depicts a schematic representation of a selected locker of the rack of lockers of FIG. 1.

Figure 5:
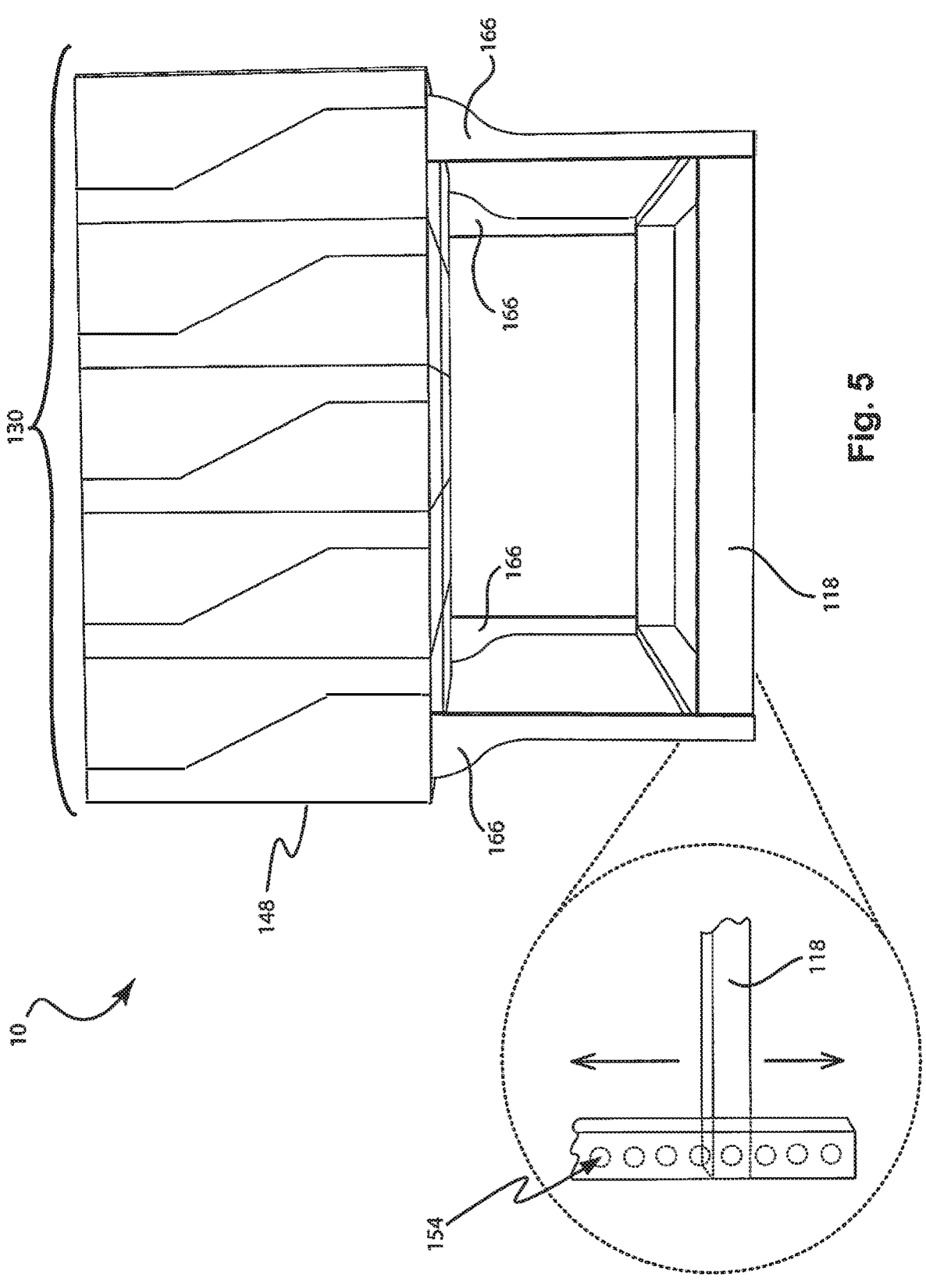

FIG. 5 (Sheet 5) depicts a perspective view of a schematic representation of an example of the rack of lockers of FIG. 1.

Figures 6A, 6B:
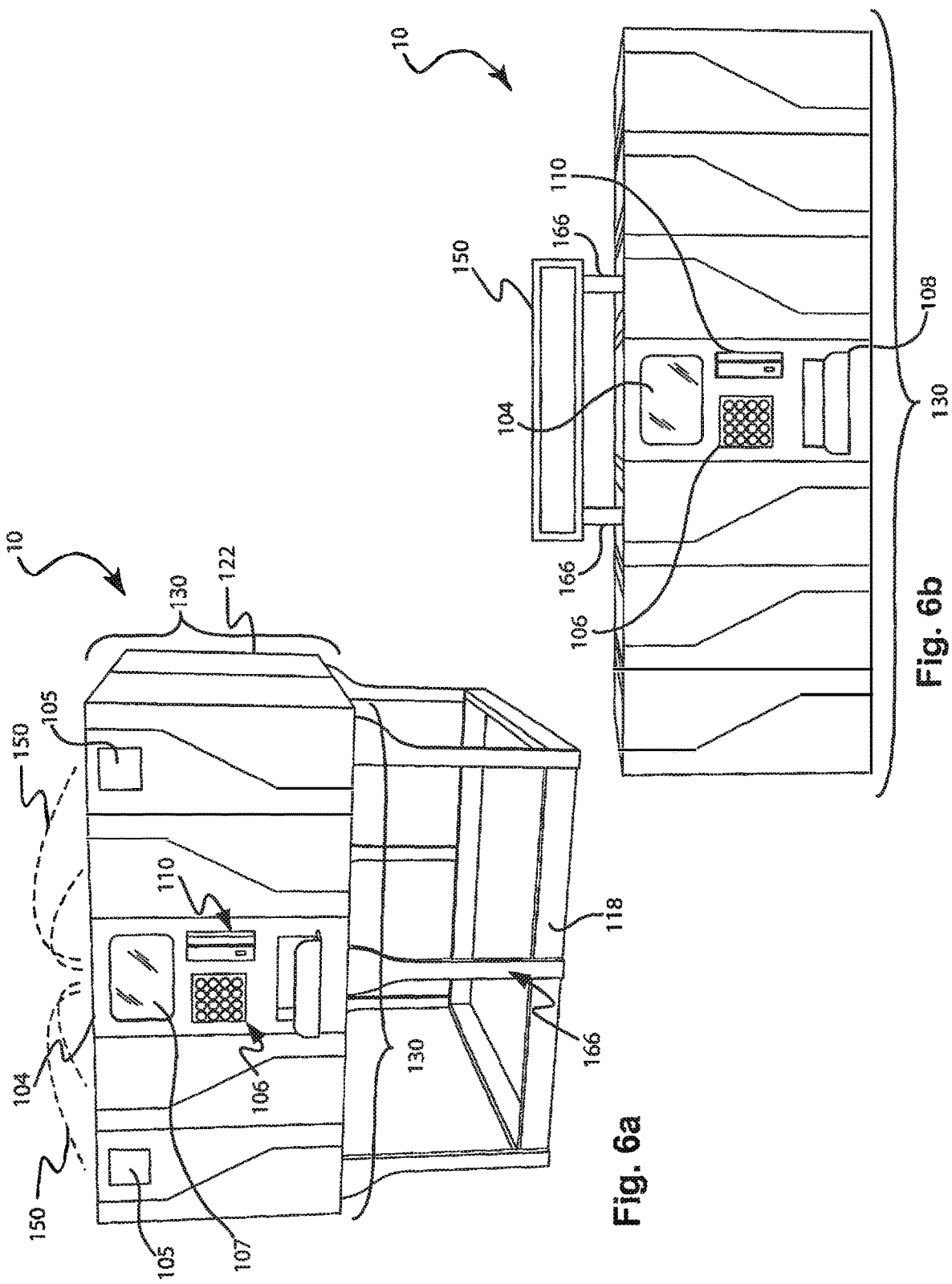

FIGS. 6A and 6B (Sheet 6) depict perspective views of schematic representation of examples of the rack of lockers of FIG. 1.

Figure 7:
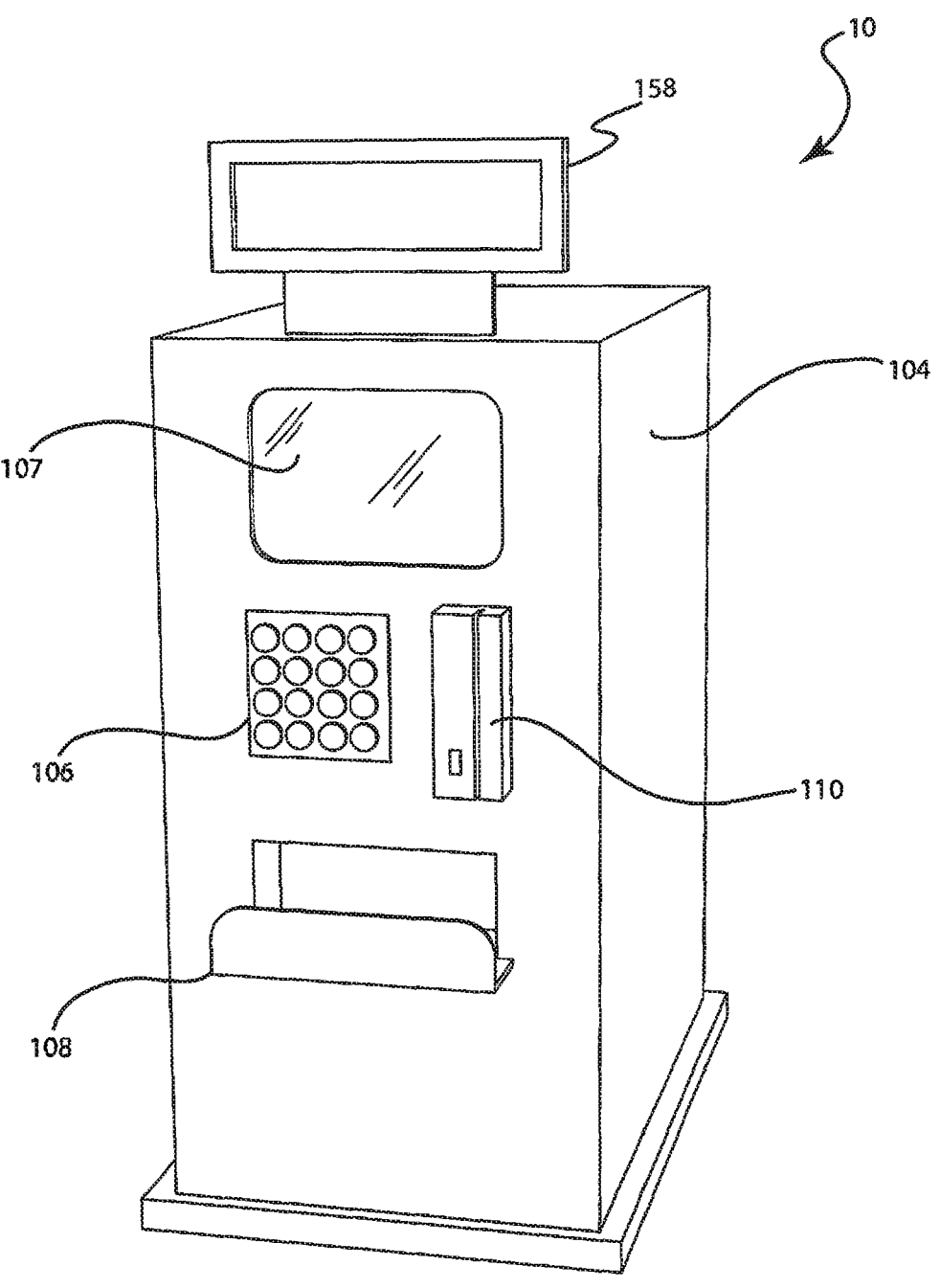

FIG. 7 (Sheet 7) depicts a perspective view of a schematic representation of an example of the point-of-presence server of FIG. 1.

Figures 8, 9, 10:
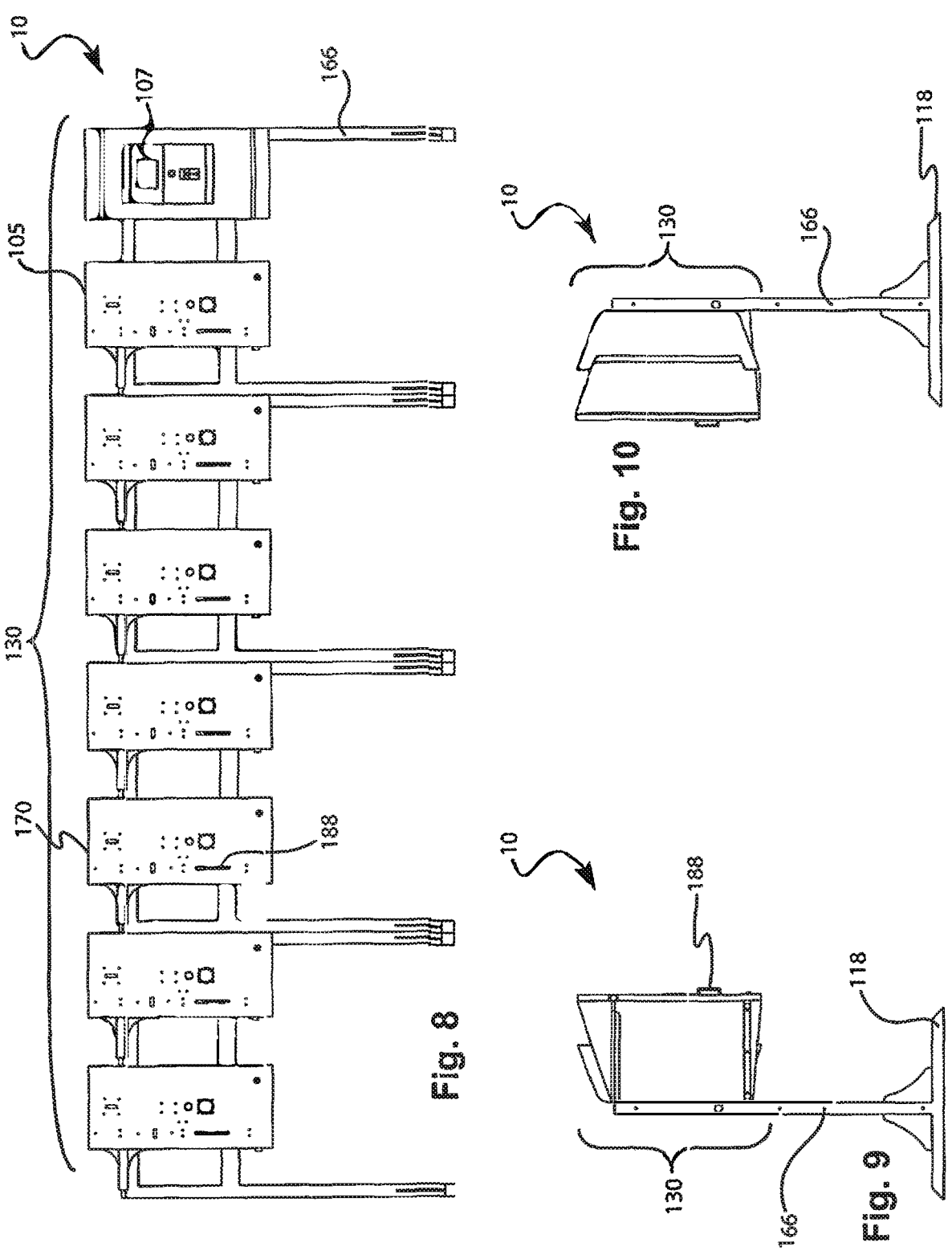

FIG. 8 (Sheet 8) depicts a front view of a schematic representation of an example of the rack of lockers of FIG. 1.

FIG. 9 (Sheet 8) depicts a side view of a schematic representation of an example of the rack of lockers of FIG. 1.

FIG. 10 (Sheet 8) depicts a side view of a schematic representation of an example of the rack of lockers of FIG. 1.

Figure 11A:
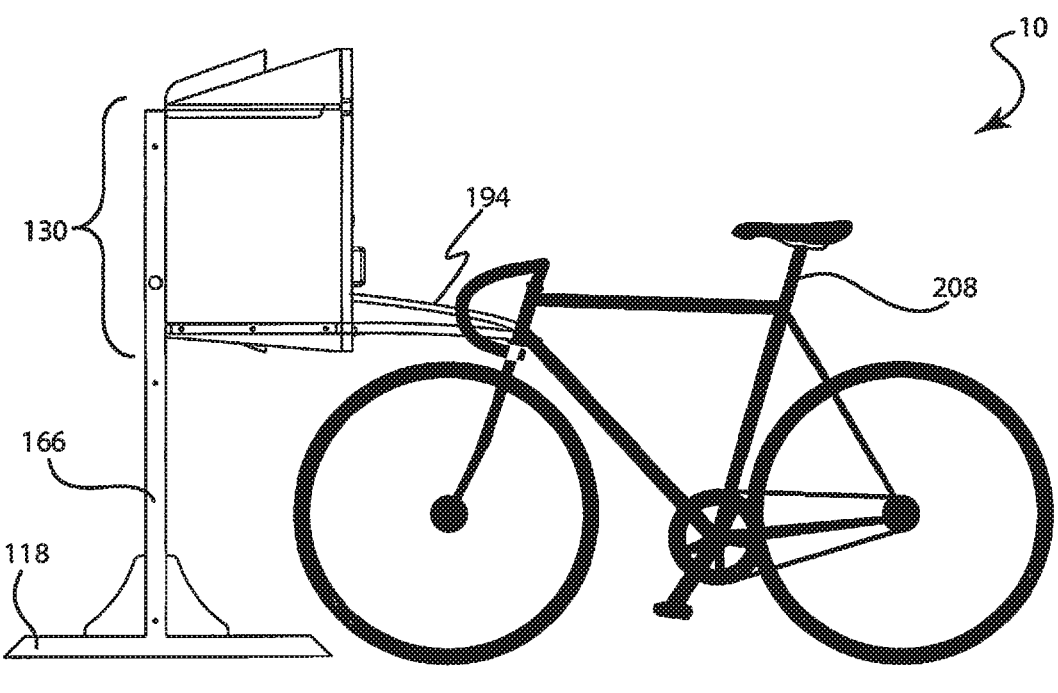
Figure 11B:
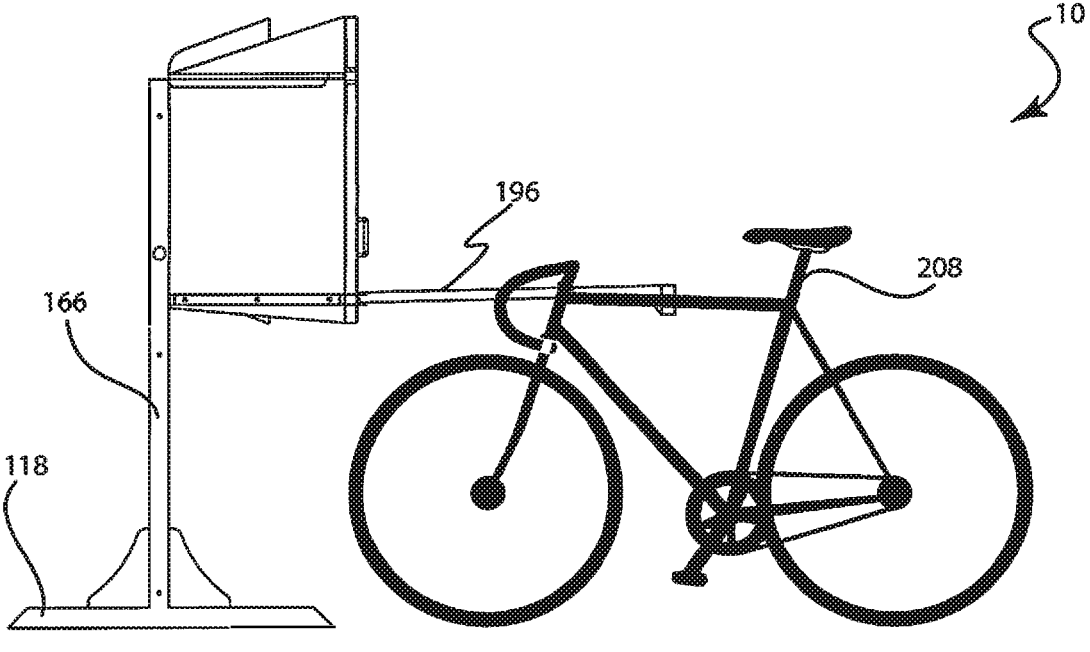

FIGS. 11A and 11B (Sheet 9) depict side views of schematic representations of examples of the rack of lockers of FIG. 1.

Figure 12:
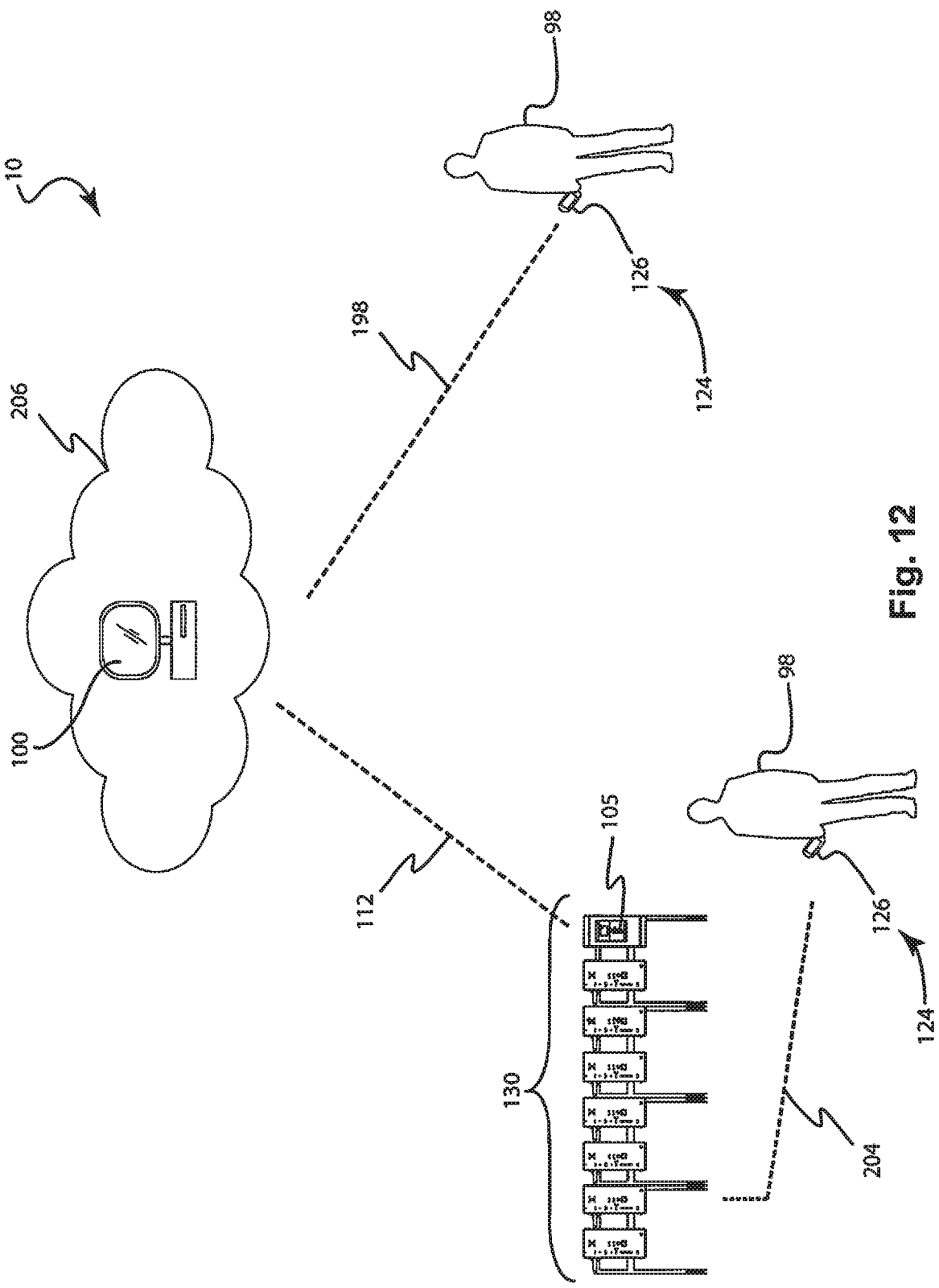

FIG. 12 (Sheet 10) depicts a schematic representation of an example of the apparatus of FIG. 1.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood, elements that are useful or necessary in commercially feasible embodiment are often not depicted in order to facilitate a less obstructed view of these various embodiments of the present disclosure.

2. REFERENCES

98 user
 100 key-facilitation server
 102 communication link
 104 point-of-presence server
 105 locker server
 106 keypad assembly
 107 user screen
 108 key-dispensing assembly
 110 card-reader assembly
 112 communication link
 114 locker rack
 116 locker door
 118 mounting-rack assembly
 120 communications card
 122 suspended locker rack
 124 access key
 126 smartphone
 128 locker rack
 130 lockers
 132 barcode scanner
 134 near-frequency reader
 136 display screen
 138 open locker slot
 140 screw panels
 142 locker divider
 150 communications link
 152 communications link
 154 measured notches
 162 second compartment
 164 storage space
 166 optional leg
 170 selected locker
 188 handle
 194 security latch
 198 communication link
 204 communication link
 206 network
 208 article

DETAILED DESCRIPTION OF PREFERRED EMBODIMENTS

The following description is not to be taken in a limiting sense, but is made merely for the purpose of describing the general principles of exemplary embodiments, many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, the appearances of the phrases "in one embodiment," "in an embodiment," and similar language throughout this specification may, but do not necessarily, all refer to the same embodiment.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

Unless otherwise indicated, the drawings are intended to be read (e.g., the arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

For the purposes of promoting an understanding of the principles of the present invention, reference will now be made to the embodiments illustrated in the drawings and specific language will be used to describe the same.

Generally speaking, the drawings (Figs.) depict various schematic representations of the examples of an apparatus 10. The apparatus 10 may include at least one (or more) instance of a key-facilitation server 100, a locker server 105, a point-of-presence server 104 and/or a rack of lockers 130, etc. It will be appreciated that different manufacturers (or a single manufacturer) may make and/or sell at least one or more instances of the key-facilitation server 100, the locker server 105, the point-of-presence server 104 and/or the rack of lockers 130, etc. The following describes the options (also known as variations, alternatives, and/or modifications) of the apparatus 10 regardless of whether or not the following description identifies whether any such option is explicitly labeled or not explicitly labeled as such.

Referring now to FIG. 1 (Sheet 1), there is depicted schematic representation of the apparatus 10. FIG. 1 also depicts a user 98, the key-facilitation server 100, a communication link 102, the point-of-presence server 104, the locker server 105, a keypad assembly 106, a user screen 107, a key-dispensing assembly 108, a card-reader assembly 110, a communication link 112, a locker rack 114, locker doors 116, a mounting-rack assembly 118, a communications card 120, a suspended locker rack 122, an access key 124, a smartphone 126, a locker rack 128, a rack of lockers 130, a communications link 150, and a communications link 152.

The communications card 120 may be configured to use wireless technology if so required. The communications card 120 is configured to facilitate operative communication between the locker server 105 and any one of the key-facilitation server 100 and/or the point-of-presence server 104 as may be required. The near-frequency reader 134 is configured to facilitate operative communication between the access key 124 and the locker server 105. The communication link 102 is configured to facilitate operative communications (directly or indirectly) between the point-of-presence server 104 and the key-facilitation server 100. The communication link 112 is configured to facilitate operative communications (directly or indirectly) between the key-facilitation server 100 and the locker server 105. The communications link 150 is configured to facilitate operative communications (directly or indirectly) between the point-of-presence server 104 and the locker server 105. The communications link 152 is configured to facilitate communications between an object (device, mechanism) that holds the access key 124 and the locker server 105. It will be appreciated that an example of the object that tangibly stores or holds the access key 124 is the smartphone 126 (but not limited thereto) or included in the smartphone 126. The object may be the smartphone 126, type of cell phone, any type of transmitting device, a portable computer, a tablet, or any equivalent thereof. The smartphone 126 is a mobile phone built on a mobile operating system, with more advanced computing capability and connectivity than a feature phone. The smartphone 126 may combine a personal digital assistant (PDA) with a mobile phone, along with a portable media player, a digital camera, and/or a GPS (Global Positioning System) navigation unit, to form a multi-use device. The smartphone 126 may also include a high-resolution touchscreen and a web browser that displays web pages as well as mobile-optimized sites. It will be appreciated that the aspects of the apparatus 10 are not limited to a Smartphone per se; the apparatus 10 may work with any object that is equivalent to Smartphone or any other devices that do not have to be a Smartphone per se.

The user 98 has personal belongings, such as a food item, a bag, etc., and/or equipment, sporting-goods equipment, such as skis, snowboards, bicycles, skateboards, scooters, motorized vehicles, elongated equipment, non-elongated equipment, etc., that the user 98 wants to securely store. This may occur in places such as ski resorts, beaches, parks, universities, municipalities, and any place where people generally congregate. The user 98 may also want to retrieve and move their personal belongings from one secure location to another secure location.

A rack of lockers 130 includes any material configured to allow the contents therein to be secured to the satisfaction of the user 98. The material preferably includes metal components, and any durable material is suitable. The rack of lockers 130 includes at least one or more instances of a selectable locker (available locker) each having at least one or more locker doors 116 configured to secure access to a respective instance of the selectable locker. The rack of lockers 130 may include instances of a locker rack 114 configured to be positioned back-to-back with another locker rack 128, on top of each other, or configured in any preferable manner. In the case where the rack of lockers 130 is installed at a ski resort, the components are placed outdoors in proximity of each other.

In accordance with an option, the rack of lockers 130 includes a suspended locker rack 122, and a mounting-rack assembly 118 (also called a foundation). The mounting-rack assembly 118 is configured to support or mount the suspended locker rack 122 in air (off the ground). The mounting-rack assembly 118 is configured to be durable enough to secure the rack of lockers 130 in the air without appreciable risk of the rack of lockers 130 inadvertently falling. The mounting-rack assembly 118 preferably includes metal components or any durable material suitable for its purpose (or equivalent thereof).

The rack of lockers 130 is configured to include metal components and/or plastic components. The rack of lockers 130 is configured to include the locker rack 114 positioned in a back-to-back arrangement, suspended in the air on a stable set of beams extending from the mounting-rack assembly 118. The rack of lockers 130 includes a locker rack 128 (facing a back side) configured to be assignable for reservation. Each instance of a locker (of the locker rack 128) includes an instance of the locker doors 116. The instance of the locker doors 116 is configured to secure or restrict access to equipment belonging to one or more users. The rack of lockers 130 includes electronic equipment configured to be powered by a battery source that is either of the rechargeable type or of the plug-in type. A communications card 120 is placed within or on the rack of lockers 130, and is configured to supply wireless connection. Optionally, a smartphone 126 of the user 98 includes an application configured to provide a system-compatible application that stores and provides the access key 124 for use with the key-facilitation server 100, the point-of-presence server 104, and/or the locker server 105.

The key-facilitation server 100 is configured to operatively connect to the point-of-presence server 104 and the locker server 105. According to an option, the key-facilitation server 100 is configured to manage the communication link 102, the communication link 112, and the communications link 150. Communication between the point-of-presence server 104, the key-facilitation server 100, and the rack of lockers 130 is configured to be synchronized by a network (either wireless or non-wireless) that centrally stores and manages data information and/or a collection of access keys. POP (point-of-presence) is an access point to a network, such as the Internet. The point-of-presence server 104 is a device configured to access the network at a selected instance of the access point of the network. ISPs (Internet Service Providers) have multiple POP devices. A point of presence is a physical location, either part of the facilities of a telecommunications provider that the ISP rents or a separate location from the telecommunications provider, that houses servers, routers, switches, and/or digital/analog called aggregators (etc.). The Internet is a global network configured to connect many computers together globally, forming a network in which any computer can communicate with any other computer, as long as they are both connected to the Internet. The World Wide Web, or simply the Web, is a way of accessing information over the medium of the Internet. It is an information-sharing model that is built on top of the Internet.

The point-of-presence server 104 is configured to facilitate or provide a mobile hotspot with hard-wire LAN networks (Local Area Network) or a wireless connection configured to establish the communications link 150 with the rack of lockers 130. Operation of the key-facilitation server 100 may include, but is not limited to, RFID (Radio Frequency Identification) technology, Bluetooth technology, self-set pin code technology, voice recognition technology, biometrics technology, and/or bar code technology (and any equivalent thereof). The point-of-presence server 104 includes a user screen 107 configured to display operable options for the guest (user). The point-of-presence server 104 includes the keypad assembly 106 configured to receive input commands from the user 98. The point-of-presence server 104 includes a card-reader assembly 110 configured to read a credit card or other (debit card), and the key-dispensing assembly 108. The key-dispensing assembly 108 may be configured for near-frequency operation, or barcode operation. The point-of-presence server 104 is configured to distribute (directly or indirectly) at least one instance of the access key 124 (to the user 98) in an object (device) that tangibly stores or holds the access key 124. Examples of the object (device) may include an RFID card, a bracelet mechanism, a sticker assembly, a band structure, etc., (and any equivalent thereof). The access key 124 may be configured for a near-frequency operation if so desired. It is understood that any reference to the access key 124 may include (implicitly or explicitly) the object that stores the access key 124. According to an option, the point-of-presence server 104 is configured to facilitate the purchase of the access key 124 for usage by the user 98. Each instance of the access key 124 is configured to enable or facilitate locking and unlocking of an instance of a selected locker of the rack of lockers 130 as required or identified by the user of the access key 124.

The key-dispensing assembly 108 is configured to distribute the access key 124 to the user 98 in response to the point-of-presence server 104 facilitating a successful user purchase of the access key 124 (or facilitate distribution thereof). Optionally, the smartphone 126 of the user 98 may be configured to transport a pre-paid unique barcode configured to unlock and lock the selected locker of the rack of lockers 130. For the case where the Smartphone 126 includes an app (an application otherwise called a software program), the app of the Smartphone 126 is configured to permit the user to operate (that is, to gain access to) an instance of a locker of the rack of lockers 130 (either with or without the use of a barcode if so desired). In order to facilitate user access to a locker, the app of the Smartphone 126 is configured to suitably interface with the API (Application Program Interface) associated with the locker controller (that is, the locker server 105) of the rack of lockers 130. The API is a set of routines, protocols, and tools for building software applications, etc. For this case, the app of the Smartphone 126 is configured to unlock and to lock a locker door of the locker (in response to interactions with the user via the user interface of the smartphone 126); the user may stand or be located remotely from the locker or the user may be standing in front of the locker (as may be desired or required) in order to gain access to the locker. The individual lockers of the rack of lockers 130 are configured to maintain and secure the stored equipment of the user for an allotted (predetermined) time. Monetary transactions may be conducted under the form of credit cards or debit cards read by a card-reader assembly 110 (or equivalent thereof) positioned on the point-of-presence server 104. Alternatively, the app (application) installed on the Smartphone 126 tangibly stores registered credit card information (or credentials) in the user's account, etc. According to an option, the individual lockers of the rack of lockers 130 are configured to maintain and secure the stored equipment of the user for however long the user would like (such as a pay-as-you-go approach and not necessarily limited to any predetermined lengths of time. According to another option, a user may sign up (online via a web site) for a membership card or a gift card prior to using an instance of a locker of the rack of lockers 130. The pre-paid membership card may provide or represent the access key 124 to the user.

Some advantages, without limitation, of the apparatus 10 provide or allow the user 98 to securely and conveniently store different equipment outdoors. The flexibility of smart-phones and near-frequency keys allow the user to conveniently use the key-facilitation server 100 in various ways. As well, the key-facilitation server 100 may be configured to generate/collect revenue from the fee transactions of the service, and may enhance the guest experience at establishments.

In view of the foregoing, according to an option, the apparatus 10 is configured for use with the rack of lockers 130. The apparatus 10 includes the key-facilitation server 100 configured to cooperate with the locker server 105. The key-facilitation server 100 is also configured to receive a key-access request. The key-access request is configured to indicate a user request configured to request usage of the access key 124. The access key 124 is configured to be usable by the locker server 105. The locker server 105 is configured to receive a locker-access request (from the user 98). The locker-access request is configured to indicate access of a selected locker the user requested (user 98 provides an indication or a command to request access). The locker server 105 is configured to use the access key 124 so as to facilitate secured user access of the selected locker associated with the rack of lockers 130. In addition, the key-facilitation server 100 is further configured to transmit a key-deployment indication configured to indicate approved deployment of the access key 124 in such a way that the access key 124 is operatively usable (directly or indirectly) by the locker server 105. In response to the locker server 105 receiving (directly or indirectly) the locker-access request and the access key 124, the locker server 105 facilitates, by using the access key 124, secured user access to the selected locker of the rack of lockers 130.

According to yet another option, the apparatus 10 is adapted such that the key-facilitation server 100 is further configured to receive a user-payment record. The user-payment record is configured to indicate a payment option in which to pay for usage of the access key 124. The key-facilitation server 100 is further configured to transmit a payment request, in response to receiving the user-payment record, to a financial-transaction server. The payment request is configured to request the financial-transaction server to transact payment for the access key. The key-facilitation server 100 is further configured to receive a payment confirmation from the financial-transaction server. The payment confirmation is configured to confirm successful payment transaction was executed and associated with the user-payment record. The key-facilitation server 100 is further configured to transmit the key-deployment indication in response to receiving the payment confirmation from the financial-transaction server. The key-facilitation server 100 is further configured to maintain and manage billing and metering of transactions associated with the rack of lockers 130.

According to yet another option, the apparatus 10 is adapted such that the locker server 105 is further configured to operatively connect (directly or indirectly) with the selected locker. The key-facilitation server 100 is further configured to selectively lock and unlock the selected locker by using the access key 124, in response to the locker server 105 receiving the locker-access request. The locker-access request is configured to indicate access to the selected locker is user requested. In accordance with an alternative, the key-facilitation server 100 is configured to remotely (selectively) open and close an instance of the locker of the rack of lockers 130 (in response to receiving a command from the user of the key-facilitation server 100 to do just so).

According to another option, the apparatus 10 is further adapted so that the key-facilitation server 100 is configured to operatively communicate with a point-of-presence server 104. The point-of-presence server 104 is configured to receive (directly or indirectly) the key-access request. The point-of-presence server 104 is further configured to transmit (directly or indirectly) the key-access request to the key-facilitation server 100. The point-of-presence server 104 is further configured to receive the key-deployment indication from the key-facilitation server 100. The point-of-presence server 104 is further configured to transmit the access key 124 the access key 124 to the locker server 105. This is done in such a way that in response to the locker server 105 receiving the locker-access request and the access key 124, the locker server 105 facilitates (by using the access key 124) secured user access to the selected locker of the rack of lockers 130.

According to another option, the apparatus 10 includes a point-of-presence server 104. The point-of-presence server 104 is configured to cooperate with a locker server 105. The point-of-presence server 104 is further configured to operatively communicate with the key-facilitation server 100. The point-of-presence server 104 is further configured to receive a key-access request. The key-access request is configured to indicate a user request configured to request usage of the access key. The access key 124 is configured to be usable by a locker server 105. The locker server 105 is configured to receive a locker-access request. The locker-access request is configured to indicate access of a selected locker is user requested. The locker server 105 is configured to use the access key 124 so as to facilitate secured user access of the selected locker associated with the rack of lockers 130. The point-of-presence server 104 is further configured to transmit (directly or indirectly) the key-access request to the key-facilitation server 100. The point-of-presence server 104 is further configured to receive a key-deployment indication from the key-facilitation server 100. The key-facilitation server 100 is configured to transmit the key-deployment indication configured to indicate approved deployment of the access key 124 in such a way that the access key 124 is operatively usable (directly or indirectly) by the locker server 105. The point-of-presence server 104 is further configured to transmit the access key 124 to the locker server 105. This is done in such a way that in response to the locker server 105 receiving the locker-access request and the access key 124, the locker server 105 facilitates (by using the access key 124) secured user access to the selected locker of the rack of lockers 130. In response to the locker server 105 receiving (directly or indirectly) the locker-access request and the access key 124, the locker server 105 facilitates, by using the access key 124, secured user access to the selected locker of the rack of lockers 130.

According to another option, the point-of-presence server 104 is adapted in such a way that the point-of-presence server 104 is further configured to transmit the access key 124 to the key-dispensing assembly 108. The key-dispensing assembly 108 is configured to transmit (directly or indirectly) the access key 124 to the locker server 105. This is done in such a way that in response to the locker server 105 receiving (directly or indirectly) the locker-access request and the access key 124, the locker server 105 facilitates (by using the access key 124) secured user access to the selected locker of the rack of lockers 130.

It will be appreciated that the apparatus 10 may use a method of operating the key-facilitation server 100 for use with a rack of lockers 130. The method includes receiving the key-access request. The key-access request is configured to indicate the user request configured to request usage of an access key 124. The access key 124 is configured to be usable by a locker server 105. The locker server 105 is configured to receive a locker-access request. The locker-access request is configured to indicate access of a selected locker of the rack of lockers 130 is user requested. The locker server 105 is configured to use the access key 124 so as to facilitate secured user access of the selected locker associated with the rack of lockers 130. The method also includes transmitting a key-deployment indication configured to indicate approved deployment of the access key 124 in such a way that the access key 124 is operatively usable (directly or indirectly) by the locker server 105. In response to the locker server 105 receiving (directly or indirectly) the locker-access request and the access key 124, the locker server 105 facilitates, by using the access key 124, secured user access to the selected locker of the rack of lockers 130.

In view of the foregoing, in accordance with an option, the apparatus 10 is configured for use with a rack of lockers 130. The apparatus 10 includes an instance of the locker server 105. The locker server 105 is configured to cooperate with the key-facilitation server 100. The key-facilitation server 100 is configured to receive a key-access request. The key-access request is configured to indicate the user request configured to request usage of an access key 124. The access key 124 is configured to be usable by the locker server 105. The key-facilitation server 100 is configured to transmit a key-deployment indication configured to indicate approved deployment of the access key 124 in such a way that the access key 124 is operatively usable (directly or indirectly) by the locker server 105. The locker server 105 is further configured to receive a locker-access request. The locker-access request is configured to indicate access of a selected locker of the rack of locker server 105 is user requested. The locker server 105 is further configured to use an access key 124 so as to facilitate secured user access of the selected locker associated with the rack of lockers 130.

In view of the foregoing, in accordance with an option, the apparatus 10 is configured for use with the rack of lockers 130 having the locker server 105. The locker server 105 is configured to cooperate with a key-facilitation server 100. The key-facilitation server 100 is configured to receive a key-access request. The key-access request is configured to indicate a user request configured to request usage of an access key 124. The access key 124 is configured to be usable by the locker server 105. The key-facilitation server 100 is configured to transmit a key-deployment indication configured to indicate approved deployment of the access key 124 in such a way that the access key 124 is operatively usable (directly or indirectly) by the locker server 105. The locker server 105 is further configured to receive a locker-access request. The locker-access request is configured to indicate access of a selected locker of the rack of locker server 105 is user requested. The locker server 105 is further configured to use the access key 124 so as to facilitate secured user access of the selected locker associated with the rack of lockers 130.

Referring now to FIG. 2 (Sheet 2), there is depicted a rear view of a schematic representation of the rack of lockers 130 of FIG. 1. Also depicted are the mounting-rack assembly 118, the communications card 120, the near-frequency reader 134, and the display screen 136. In accordance with FIG. 2, the rack of lockers 130 includes (or provides) the communications card 120, a display screen 136, a barcode scanner 132, and a near-frequency reader 134. In accordance with an option, the rack of lockers 130 may be stationary (not movable), or may be movable as may be required to satisfy a particular use/application. The user 98 may use the access key 124 (such as, a barcode of the smartphone 126) to access a selected locker by using the near-frequency reader 134 or barcode scanner 132 located (positioned) on the rack of lockers 130. The barcode scanners are (optional) placed into a central scanning screen. The key-facilitation server 100 is configured to monitor occupancy and security of each locker on the rack of lockers 130. Once a key or code is read and approved, a display screen 136 (of the locker server 105) is configured to permit the user 98 may to view locker availability. The user may then access a locker that corresponds to the access key 124 (or barcode of the smartphone 126). After the locker doors 116 have unlocked and opened, the user may store equipment therein, and the locker doors may be either be manually closed by the user 98 or may be closed by a computer-controlled timer assembly (known and not depicted). Additionally, the key-facilitation server 100 is configured to notify a user via a smartphone 126 when the locker time is approaching the run out of time (or that time has run out). According to an option, a timer is not used and the apparatus (the key-facilitation server 100) is set up and is operated on a pay-as-you-go basis (if so desired) without the use of a timer for recording the amount of time that the locker was rented, etc. In the case where the user leaves equipment in the locker after time has run out, the key-facilitation server 100 is configured to issue an alert message to a support worker that may then transport the belongings to a lost-and-found location or office. In accordance with an option, the smartphone 126 (and any equivalent thereof) is configured to tangibly store and execute an app (otherwise known as an application). For the case where a user leaves (that is, abandons) equipment in the locker for a certain (predetermined) amount of time (the amount of time may be determined by the facility operating the locker, such as a ski resort, a university, etc.), the system is configured to issue a notification to be transmitted to the user (via the smartphone 126 for example). The notification (to be displayed on the smartphone 126) provides an indication to the user that their equipment is currently stored in the locker, and the contents of the locker will be emptied and then transported to a lost-and-found location or office (for subsequent safe storage of their equipment). In this manner, the user may then obtain the equipment from the lost-and-found location (and not from the locker itself), and the empty locker is now available for usage by another user (in the meantime). The app is configured to facilitate wireless communication via a carrier service associated with the smartphone 126. Specifically, the app is configured to facilitate wireless communication between the smartphone 126 and the key-facilitation server 100. Amongst other things, the app is configured to facilitate access to an instance of locker of the rack of lockers 130, facilitate request and payments, etc. for the user of the smartphone 126 (and any equivalent thereof). In accordance with an option, the apparatus includes an object tangibly embodying an application configured to facilitate communication between the object and the key-facilitation server 100. It will be appreciated that an example of the object includes smartphone 126. In accordance with an option, the smartphone 126 is configured to ping (notify) a user with special offers and/or complimentary services based on their interaction and/or location relative to the location of the lockers. In accordance with an option, the application is configured to facilitate communication between the object and the key-facilitation server 100 via the point-of-presence server. As well, it will be appreciated in accordance with another option; the application is configured to facilitate communication between the object and the key-facilitation server 100 via a locker server associated with a rack of lockers.

Referring now to FIG. 3 (Sheet 3), there is depicted a front view of a schematic representation of the rack of lockers 130 of FIG. 1. Depicted are the screw panels 140, and the selected locker 170 of the rack of lockers 130, the rack of lockers 130, each open locker slot 138, and screw panels 140. The user 98 provides equipment that may be slidably received through each open locker slot 138 to maintain the security and placement of equipment secured by the rack of lockers 130. The rack of lockers 130 is configured to provide or to display open locker slots that expose the equipment of the user to outdoor elements. The screw panels 140 (an option) are configured to allow (slidable) insertion of a panel into a top section and a bottom section of each lockers 130 so that the open slot of the open locker slot 138 may be closed thus concealing equipment from outdoor elements. In accordance with an option, each locker of the rack of lockers 130 has an indicator configured to indicate locker-availability status; for example: the indicator may indicate to a user which locker is available or is in use. A green colored indicator may indicate that a locker is available for use; a red indicator may indicate that specific locker is currently not available for use.

Referring now to FIG. 4 (Sheet 4), there is depicted a schematic representation of a selected locker 170 of the rack of lockers 130 of FIG. 1. Also depicted are the open locker slot 138, the locker divider 142, the hanger 146, the first compartment 160, the second compartment 162, the storage space 164, and the optional leg 166. The hanger 146 includes at least one or more hinges (of metal material). The hanger 146 is fixedly positioned on the inside of first compartment 160. Within the first compartment 160 of the rack of lockers 130 there is located a storage space 164. The storage space 164 is configured to receive a backpack and/or oversized items. An advantage of the locker divider 142 is that the locker divider 142 separates the wet equipment from the dry equipment thus allowing for convenient organization within the rack of lockers 130. Additionally, the open slits are configured to allow improved comfort of sliding equipment into the rack of lockers 130 so that at least some of the equipment may remain viewable to the user.

Referring now to FIG. 5 (Sheet 5), there is depicted a perspective view of a schematic representation of an example of the rack of lockers 130 of FIG. 1. Also depicted are measured notches 154, instances of the optional leg 166, and the mounting-rack assembly 118. The mounting-rack assembly 118 of the rack of lockers 130 is configured to adapt to landscape issues. The mounting-rack assembly 118 is configured to be adjustable to selected vertical positions by locking the beams into the measured notches 154 along the front, back and sides of the rack of lockers 130. An advantage of the measured notches 154 is the flexibility for positional adjustment (vertical or side to side) of the rack of lockers 130 in order to suit a topographical environment, whether the ground is sloped or flat, etc. Optionally, the instances of the optional leg 166 (extending from the rack of lockers 130) is configured for insertion into the ground, and the suspension of the rack of lockers 130 may be adjusted to the measured heights indicated by the measured notches 154 if so desired. Referring now to FIGS. 6A and 6B (Sheet 6), there are depicted perspective views of schematic representation of examples of the rack of lockers 130 of FIG. 1. Also depicted are the point-of-presence server 104, the keypad assembly 106, the card-reader assembly 110, the suspended locker rack 122, and the optional leg 166. According to an option, the keypad assembly 106 is located on the touch screen (a preferred option); however, it will be appreciated that the keypad assembly 106 may be located in any convenient location or position and the apparatus may operate just as well. The communications link 150 is configured to operatively link (directly or indirectly) communications between the point-of-presence server 104 to the each instance of the locker server 105 associated with the rack of lockers 130. The rack of lockers 130 includes the point-of-presence server 104 located (mountably positioned) centrally in the rack of lockers 130. Variations may include any geometrical configuration of the rack of lockers 130 and of the point-of-presence server 104. The communication and operation of the point-of-presence server 104, key-facilitation server 100, and the locker server 105 may remain the same as described for FIG. 1 (if so desired).

Referring now to FIG. 6A, an optional leg 166 extends from the ground or from the mounting-rack assembly 118, and the optional leg 166 is configured to support the extra weight of the point-of-presence server 104 suspended in the air with the suspended locker rack 122. It will be appreciated that the suspended locker rack 122 is a variation of the rack of lockers 130. The user screen 107 is configured to display the vacancy of the available lockers to users. An advantage of having the point-of-presence server 104 built into the rack of lockers 130 is for improved user facilitation of the rack of lockers 130 at a convenient location, instead of purchasing keys from a point-of-presence server 104. The user screen 107 is configured to show occupied and/or empty instances of the rack of lockers 130 to the user, which cannot always be easily determined if no equipment is stored in the rack of lockers 130. The equipment may be elongated, such as skis, bicycles, etc., or may be non-elongated.

Referring now to FIG. 6B, there is an option depicted in which the mounting-rack assembly 118 is configured to be mounted (either directly or indirectly) to a wall or ceiling in a room or other structure, and the rack of lockers 130 is fixedly connected to the mounting-rack assembly 118. In this manner, the rack of lockers 130 is suspended aboveground, in the air.

Referring now to FIG. 7 (Sheet 7), there is depicted a perspective view of a schematic representation of an example of the point-of-presence server 104 of FIG. 1. The point-of-presence server 104 includes the user screen 107 configured to display vacancy status of available lockers associated with the rack of lockers 130 (depicted in FIG. 1) for use by the user 98, as explained in the description associated with FIG. 6. For the example of FIG. 7, the point-of-presence server 104 is a stand-alone unit, and is spaced apart from or separated from (not coupled to) the rack of lockers 130 of FIG. 1. In the case where a card reader is required, the point-of-presence server 104 includes the card-reader assembly 110 configured to read credit cards, debit cards, money cards, etc.

Referring now to FIG. 8 (Sheet 8), there is depicted a front view of a schematic representation of an example of the rack of lockers 130 of FIG. 1, along with the selected locker 170, a handle 188 for the selected locker 170, the point-of-presence server 104, the user screen 107, and the locker server 105. The locker server 105 is configured to control each instance of a locker associated with the rack of lockers 130. The point-of-presence server 104 is coupled to a section of the rack of lockers 130. It will be appreciated that the rack of lockers 130 may be coupled to the point-of-presence server 104 by way of any configuration adapted to do just so.

Referring now to FIG. 9 (Sheet 8), there is depicted a side view of a schematic representation of an example of the rack of lockers 130 of FIG. 1. It will be appreciated that the rack of lockers 130 may be coupled to the mounting-rack assembly 118 by way of any structural configuration adapted to do just so.

Referring now to FIG. 10 (Sheet 8), there is depicted a side view of a schematic representation of an example of the rack of lockers 130 of FIG. 1. It will be appreciated that the rack of lockers 130 may be coupled to the mounting-rack assembly 118 by way of any structural configuration adapted to do just so.

Referring now to FIGS. 11A and 11B (Sheet 9), there are depicted side views of schematic representations of examples of the rack of lockers 130 of FIG. 1, as well as a security latch 194 and an article 208 (such as a bicycle). The security latch 194 is configured to selectively securely latch a portion of the article 208 to a section of the rack of lockers 130. It will be appreciated that any portion of the article 208 may be securely latched to any section of the rack of lockers 130 by the security latch 194.

Referring now to FIG. 12 (Sheet 10), there is depicted a schematic representation of an example of the apparatus 10 of FIG. 1, as well as the user 98, the key-facilitation server 100, the access key 124 (depicted as installed in the smartphone 126), the rack of lockers 130, a communication link 112, a communication link 198, and a communication link 204.

A first key-management arrangement includes the following: the key-facilitation server 100 transmits the access key 124 to the locker server 105 via the communication link 112 configured to facilitate communications between the locker server 105 and the key-facilitation server 100 over the network 206 (the Internet). It is understood that the key-facilitation server 100 transmits the access key 124 associated with the user identifier (user ID), along with the user identifier and along with a locker identifier, to the locker server 105 via the communication link 112. The locker server 105 retains the access key 124, the user identifier and the locker identifier. In the case where the user 98 wants to access the selected locker, the locker server 105 transmits (directly or indirectly) the user identifier to the locker server 105 via the communication link 204. The communication link 204 is configured to facilitate communications between the locker server 105 and the device that holds the access key 124 (such as smartphone 126). The locker server 105 permits access to the user 98 in response to receiving the user identifier from the object that holds the access key 124 (such as the smartphone 126). In the case where the user identifier held by the locker server 105 matches the user identifier transmitted by the object that holds the access key 124; then the locker server 105 uses the access key 124 to unlock the selected locker associated with the locker identifier that is associated with the user identifier.

A second key-management arrangement includes the following: the key-facilitation server 100 transmits the access key 124 to the locker server 105 via the communication link 112 configured to facilitate communications between the locker server 105 and the key-facilitation server 100 over the network 206 (the Internet). It is understood that the key-facilitation server 100 transmits the access key 124 associated with the user identifier (user ID), along with the user identifier and along with a locker identifier, to the locker server 105 via the communication link 112. The locker server 105 retains a copy of the user identifier and the locker identifier. The locker server 105 transmits the access key 124 to the object that will hold the access key 124 (such as smartphone 126) that is associated with the user identifier. In the case where the user 98 wants to access the selected locker, the object that holds the access key 124 (Smartphone 126) transmits the access key 124 to the locker server 105 via the communication link 204. The communication link 204 is configured to facilitate communications between the locker server 105 and the object that holds the access key 124. The locker server 105 permits access to the user 98 in response to receiving the access key 124 from the object that holds the access key 124 for the case where the locker identifier held by the locker server 105 matches the access key 124 transmitted by the object holding the access key 124. Then the locker server 105 uses the access key 124 to unlock the selected locker associated with the access key 124 transmitted by the object holding the access key 124 (such as the smartphone 126).

A third key-management arrangement includes the following: the key-facilitation server 100 transmits the access key 124 to the object holding the access key 124 (such as the smartphone 126) via the communication link 198. The communication link 198 is configured to facilitate operative communication between the key-facilitation server 100 and the object holding the access key 124 (such as the smartphone 126) via the network 206 (the Internet). It is understood that the key-facilitation server 100 transmits the access key 124 associated with the user identifier (user ID) along with a locker identifier, to the object holding the access key 124 (such as the smartphone 126). For the case where the user 98 wants to access the selected locker, the object holding the access key 124 retains a copy of the access key 124 and of the locker identifier. The object holding the access key 124 (such as the smartphone 126) transmits (in response to receiving a user command to do just so) the access key 124 to the locker server 105. The locker server 105 permits access to the selected locker to the user 98 in response to receiving the access key 124 from the object holding the access key 124 for the case where the locker identifier held by the locker server 105 matches with (corresponds to) the access key 124 transmitted by the object holding the access key 124. The object may be the smartphone 126 for example. Then the locker server 105 uses the access key 124 to unlock the selected locker associated with the access key 124 transmitted by the object holding the access key 124.

Servers

A server may be a physical computer (a computer hardware system) dedicated to run one or more services (as a host), to serve the needs of the users of other computers on a network. A server may also be a virtual machine (VM). The virtual machine is a simulation of a computer system (abstract or real) that is usually different from the target computer system (where it is being simulated on). A server may be a cloud-based server; Cloud computing is a colloquial expression used to describe a variety of different computing concepts that involve a large number of computers that are connected through a (real-time) communication network (typically the Internet). Cloud Computing is a jargon term without a commonly accepted non-ambiguous scientific or technical definition. In science, Cloud computing is a synonym for distributed computing over a network and means the ability to run a program on many connected computers at the same time. Virtual machines may be based on the specifications of a hypothetical computer or emulate the architecture and functioning of a real-world computer.

The virtual machine is a software implementation of the physical computer system that executes programs like a physical machine. Virtual machines are separated into two major categories, based on their use and degree of correspondence to any real machine. A system virtual machine provides a complete system platform, which supports the execution of a complete operating system (OS). These usually emulate an existing architecture, and are built with either the purpose of providing a platform to run programs where the real hardware is not available for use (for example, executing software on otherwise obsolete platforms), or of having multiple instances of virtual machines lead to more efficient use of computing resources, both in terms of energy consumption and cost effectiveness (known as hardware virtualization, the key to a cloud computing environment), or both. In contrast, a process virtual machine (also, language virtual machine) is designed to run a single program, which means that it supports a single process. Such virtual machines are usually closely suited to one or more programming languages and built with the purpose of providing program portability and flexibility (amongst other things). An essential characteristic of a virtual machine is that the software running inside is limited to the resources and abstractions provided by the virtual machine—it cannot break out of its virtual environment. Depending on the computing service that it offers it could be a database server, file server, mail server, print server, web server, gaming server, or some other kind of server. In the context of client-server architecture, a server is a computer program running to serve the requests of other programs, the clients. Thus, the server performs some computational task on behalf of clients. The clients either run on the same computer or connect through the network. In the context of Internet Protocol (IP) networking, a server is a program that operates as a socket listener. Servers often provide essential services across a network, either to private users inside a large organization or to public users via the Internet.

According to one option, the servers include computer-executable instructions configured to operate the servers in accordance with the description provided above. The servers may use computer software, or just software, which is a collection of computer programs (server-executable instructions) and related data that provide the instructions for instructing the servers what to do and how to do it. In other words, software is a conceptual entity that is a set of computer programs, procedures, and associated documentation concerned with the operation of a controller assembly, also called a data-processing system. Software refers to one or more computer programs and data held in a storage assembly (a memory module) of the controller assembly for some purposes. In other words, software is a set of programs, procedures, algorithms and its documentation. Program software performs the function of the program it implements, either by directly providing instructions to computer hardware or by serving as input to another piece of software. In computing, an executable file (executable instructions) causes the servers to perform indicated tasks according to encoded instructions, as opposed to a data file that must be parsed by a program to be meaningful. These instructions are machine-code instructions for a physical central processing unit. However, in a more general sense, a file containing instructions (such as byte-code) for a software interpreter may also be considered executable; even a scripting language source file may therefore be considered executable in this sense. While an executable file can be hand-coded in machine language, it is far more usual to develop software as source code in a high-level language understood by humans, or in some cases, an assembly language more complex for humans but more closely associated with machine code instructions. The high-level language is compiled into either an executable machine code file or a non-executable machine-code object file; the equivalent process on assembly language source code is called assembly. Several object files are linked to create the executable. The same source code can be compiled to run under different operating systems, usually with minor operating-system-dependent features inserted in the source code to modify compilation according to the target. Conversion of existing source code for a different platform is called porting. Assembly-language source code and executable programs are not transportable in this way. An executable comprises machine code for a particular processor or family of processors. Machine-code instructions for different processors are completely different and executables may be incompatible. Some dependence on the particular hardware, such as a particular graphics card may be coded into the executable. It is usual as far as possible to remove such dependencies from executable programs designed to run on a variety of different hardware, instead installing hardware-dependent device drivers on the servers, which the program interacts with in a standardized way. Some operating systems designate executable files by filename extension (such as .exe) or noted alongside the file in its metadata (such as by marking an execute permission in Unix-like operating systems). Most also check that the file has a valid executable file format to safeguard against random bit sequences inadvertently being run as instructions. Operating systems retain control over the resources of the servers, requiring that individual programs make system calls to access privileged resources. Since each operating system features its own system call architecture, executable files are generally tied to specific operating systems, or families of operating systems. There are many tools available that make executable files made for one operating system work on another one by implementing a similar or compatible application binary interface. When the binary interface of the hardware the executable was compiled for differs from the binary interface on which the executable is run, the program that does this translation is called an emulator. Different files that can execute but do not necessarily conform to a specific hardware binary interface, or instruction set, can be represented either in byte-code for Just-in-time compilation, or in source code for use in a scripting language.

According to another option, the servers may include application-specific integrated circuits configured to operate the servers in accordance with the description provided above. According to another option, the servers may include a combination of the application-specific integrated circuits and the software. It may be appreciated that an alternative to using software (controller-executable instructions) in the server is to use an application-specific integrated circuit (ASIC), which is an integrated circuit (IC) customized for a particular use, rather than intended for general-purpose use. For example, a chip designed solely to run a cell phone is an ASIC. Some ASICs include entire 32-bit processors, memory blocks including ROM (random only memory), RAM (random access memory), EEPROM (electronically erasable programmable read only memory), flash memory and other large building blocks. Such an ASIC is often termed a SoC (system-on-chip). Designers of digital ASICs use a hardware description language (HDL) to describe the functionality of ASICs. Field-programmable gate arrays (FPGA) are used for building a breadboard or prototype from standard parts; programmable logic blocks and programmable interconnects allow the same FPGA to be used in many different applications. For smaller designs and/or lower production volumes, FPGAs may be more cost effective than an ASIC design. A field-programmable gate array (FPGA) is an integrated circuit designed to be configured by the customer or designer after manufacturing—hence field-programmable. The FPGA configuration is generally specified using a hardware description language (HDL), similar to that used for an application-specific integrated circuit (ASIC) (circuit diagrams were previously used to specify the configuration, as they were for ASICs, but this is increasingly rare). FPGAs can be used to implement any logical function that an ASIC could perform. The ability to update the functionality after shipping, partial re-configuration of the portion of the design and the low non-recurring engineering costs relative to an ASIC design offer advantages for many applications. FPGAs contain programmable logic components called logic blocks, and a hierarchy of reconfigurable interconnects that allow the blocks to be wired together—somewhat like many (changeable) logic gates that can be inter-wired in (many) different configurations. Logic blocks can be configured to perform complex combinational functions, or merely simple logic gates like AND and XOR. In most FPGAs, the logic blocks may include memory elements, which may be simple flip-flops, or more complete blocks of memory. In addition to digital functions, some FPGAs have analog features. The most common analog feature is a programmable slew rate and drive strength on each output pin, allowing the engineer to set slow rates on lightly loaded pins that would otherwise ring unacceptably, and to set stronger, faster rates on heavily loaded pins on high-speed channels that would otherwise run too slow. Another relatively common analog feature is differential comparators on input pins designed to be connected to differential signaling channels. A few "mixed signal FPGAs" have integrated peripheral Analog-to-Digital Converters (ADCs) and Digital-to-Analog Converters (DACs) with analog signal conditioning blocks allowing them to operate as a system-on-a-chip. Such devices blur the line between an FPGA, which carries digital ones and zeros on its internal programmable interconnect fabric, and field-programmable analog array (FPAA), which carries analog values on its internal programmable interconnect fabric.

Server (Computer) Programming Language

A computer programming language is an artificial language designed to communicate instructions to a machine, particularly (or such as) a computer system. Programming languages can be used to create programs that control the behavior of a machine and/or to express algorithms precisely. The earliest programming languages predate the computer system, and were used to direct the behavior of machines such as Jacquard looms and player pianos. Thousands of different programming languages have been created, mainly in the computer field, with many being created every year. Most programming languages describe computation in an imperative style, i.e., as a sequence of commands, although some languages, such as those that support functional programming or logic programming, use alternative forms of description. The description of a programming language is usually split into the two components of syntax (form) and semantics (meaning). Some languages are defined by a specification document (for example, the C programming language is specified by an ISO Standard), while other languages, such as PERL, have a dominant implementation that is used as a reference. PERL may be used, but other computer programming languages may be employed or used (if so desired).

Executable Code (Instructions)

In computing, an executable code (file) causes a computer "to perform indicated tasks according to encoded instructions," as opposed to a data file that must be parsed by a program to be meaningful. Executable code (instructions) is formed based on instructions made from a computer programming language. These instructions are traditionally machine code instructions for a physical CPU. However, in a more general sense, a file containing instructions (such as byte-code) for a software interpreter may also be considered executable; even a scripting language source file may therefore be considered executable in this sense. The exact interpretation depends upon the use; while the term often refers only to machine code files, in the context of protection against computer virus that may corrupt files, which cause potentially hazardous instruction execution, including scripts, are conveniently lumped together. While an executable file can be hand-coded in machine language, it is far more usual to develop software as source code in a high-level language easily understood by humans or in some cases an assembly language more complex for humans but more closely associated with machine code instructions. The high-level language is compiled into either an executable machine code file or a non-executable machine-code object file of some sort; the equivalent process on assembly language source code is called assembly. Several object files are linked to create the executable. The same source code can be compiled to run under different operating systems, usually with minor operating-system-dependent features inserted in the source code to modify compilation according to the target. Conversion of existing source code for a different platform is called porting. Assembly-language source code, and executable programs, is not transportable in this way. An executable comprises machine code for a particular processor or family of processors. Machine-code instructions for different processors are completely different and executables may be incompatible. Some dependence on the particular hardware, such as a particular graphics card may be coded into the executable. It is usual to remove such dependencies from executable programs designed to run on a variety of different hardware, instead installing hardware-dependent device drivers on the computer, which the program interacts with in a standardized way.

The Internet

The Internet is a global system of interconnected computer networks that use the standard Internet protocol suite (often called TCP/IP, although not all applications use TCP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents used in the World Wide Web (WWW) and the infrastructure to support email. Most traditional communications media including telephone, music, film, and television are being reshaped or redefined by the Internet, giving birth to new services such as Voice over Internet Protocol (VoIP) and Internet Protocol Television (IPTV). The Internet is an example of a network.

Network

A computer network, or simply a network, is a collection of computers and other hardware interconnected by communication channels that allow sharing of resources and information. Where at least one process in one device is able to send/receive data to/from at least one process residing in a remote device, then the two devices are said to be in a network. A network is a group of devices connected to each other. Networks may be classified into a wide variety of characteristics, such as the medium used to transport the data, a communications protocol used, scale, topology, benefit, and organizational scope. Communications protocols define the rules and data formats for exchanging information in a computer network, and provide the basis for network programming. A known communications protocol include an Ethernet standard, a hardware, and link layer standard that is ubiquitous in local-area networks, and the Internet protocol suite, which defines a set of protocols for internetworking, i.e. for data communication between multiple networks, as well as host-to-host data transfer, and application-specific data transmission formats. Computer networking is sometimes considered a sub-discipline of electrical engineering, telecommunications, computer science, information technology, or computer engineering, since it relies upon the application of these disciplines.

Client-Server Architecture

A client/server model is a computing model that acts as a distributed application that partition tasks or workloads between the providers of a resource or service, called servers, and service requesters, called clients. Often clients and servers communicate over a computer network on separate hardware, but both client and server may reside in the same system. A server machine is a host that is running one or more server programs, which share their resources with clients. A client does not share any of its resources, but requests a server's content or service function. Clients, therefore, initiate communication sessions with servers, which await incoming requests. The client/server characteristic describes the relationship of cooperating programs in an application. The server component provides a function or service to one or many clients, which initiate requests for such services. A notable example of this is the way OpenGL treats the video card of a computer as a server, with the actual application making rendering requests to it. This model is further solidified with the OpenGL Shading Language, with the user writing small programs that live in video memory, and are requested from the main program through the graphics driver. Functions such as email exchange, web access, and database access are built on the client/server model. Users accessing banking services from their computer use a web browser client to send a request to a web server at a bank. That web server runs a program which may in turn, forward the request to its own database client program, which sends a request to the bank's database server (which runs on another computer) to retrieve the account information. The balance and transaction records are returned to the bank database client, which in turn serves it back to the user's web browser client, displaying the results to the user. The client-server model has become one of the central aspects of network computing. Many business applications being written today use the client-server model, as do the Internet's main application protocols, such as HTTP (Hypertext Transfer or Transport Protocol), SMTP (Simple Mail Transfer Protocol), Telnet (a network protocol that allows a user on one computer to log on to another computer that is part of the same network), and/or DNS (Domain Name System). The interaction between client and server is often described using sequence diagrams. The Unified Modeling Language has support for sequence diagrams. Specific types of clients include web browsers, email clients, and online chat clients. Specific types of servers include web servers, FTP (file transfer protocol) servers, application servers, database servers, name servers, mail servers, file servers, print servers, and terminal servers. Most web services are also types of servers.

Cryptographic Protocol (Access Keys)

The access key 124 is configured to use a cryptographic protocol (security protocol or encryption protocol). The cryptographic protocol is a protocol that performs a security-related function and applies cryptographic methods. The cryptographic protocol provides encryption algorithms to computer records or files. The cryptographic protocol may include details about data structures and representations, at which point the cryptographic protocol may be used to implement multiple, interoperable versions of a computer program and/or computer records. Cryptographic protocols are widely used for secure application-level data transport. A cryptographic protocol may incorporate at least some of the following aspects: (a) key agreement or establishment, (b) entity authentication, (c) symmetric encryption, and message-authentication material construction, (d) secured application-level data transport, (e) non-repudiation methods. For example, Transport Layer Security (TLS) is a cryptographic protocol that is used to secure web (HTTP) connections. It has an entity authentication mechanism, based on the X.509 system; a key setup phase, where a symmetric encryption key is formed by employing public-key cryptography; and an application-level data transport function. These three aspects have important interconnections. Standard TLS does not have non-repudiation support. There are other types of cryptographic protocols as well, and even the term itself has various readings; Cryptographic application protocols often use one or more underlying key agreement methods, which are also sometimes referred to as "cryptographic protocols." In cryptography, encryption is the process of encoding messages (or information) in such a way that eavesdroppers or hackers cannot read it, but that authorized parties can. In an encryption scheme, the message or information (referred to as plaintext) is encrypted using an encryption algorithm, turning it into an unreadable cipher text. This is usually done with the use of an encryption key, which specifies how the message is to be encoded. Any adversary that can see the cipher text should not be able to determine anything about the original message. An authorized party, however, is able to decode the cipher text using a decryption algorithm that usually requires a secret decryption key that adversaries do not have access thereto. For technical reasons, an encryption scheme usually needs a key-generation algorithm, to randomly produce keys.

Information as herein shown and described in detail is fully capable of attaining the above-described object of the present disclosure, the presently preferred embodiment of the present disclosure; and is, thus, representative of the subject matter; which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the present disclosure.

What is claimed is:

1. An apparatus for use with a rack of lockers, the apparatus comprising:

a key-facilitation server configured to:

communicate with a locker server associated with the rack of lockers, the rack of lockers including:

a first compartment configured to allow storage of secondary equipment;

a second compartment having an open locker slot configured to maintain storage of equipment; and a locker divider separating the first compartment from the second compartment;

receive a key-access request configured to indicate a user request for requesting usage of an access key of a set of access keys for use in locking and unlocking lockers of the rack of lockers and stored on the key-facilitation server usable by the locker server, wherein the locker server is configured to:

receive, from a mobile device of a user, a locker-access request configured to indicate that access of a selected locker is user requested, the locker-access request comprising the access key associated with a user identifier associated with the user and a locker identifier assigned to the user, verify that the locker identifier corresponds with the access key; and use the access key to facilitate secured user access of the selected locker associated with the rack of lockers; and transmit a key-deployment indication to the locker server indicating that the access key is operatively usable;

wherein the locker server uses the access key to facilitate the secured user access of the selected locker in response to receiving the key-deployment indication.

2. The apparatus of claim 1, wherein the rack of lockers comprises at least one of a communications card, a display screen, a barcode scanner, or a near-frequency reader.

3. The apparatus of claim 2, wherein the locker server facilitates the secured user access in response to the barcode scanner scanning the access key.

4. The apparatus of claim 2, wherein the locker server facilitates the secured user access in response to the near-frequency reader reading the access key.

5. The apparatus of claim 1, wherein the key-facilitation server is configured to monitor an occupancy of each of the rack of lockers.

6. The apparatus of claim 2, wherein, once the access key is scanned or read, the display screen is configured to display locker availability.

7. The apparatus of claim 1, wherein the key-facilitation server is configured to notify a user device when a rental expiration is approaching.

* * * * *